United States Patent [19]

Mohlenkamp, Jr. et al.

[11] Patent Number: 5,120,563

[45] Date of Patent: * Jun. 9, 1992

[54] FOOD COMPOSITIONS CONTAINING REDUCED CALORIE FATS AND REDUCED CALORIE SUGARS

[75] Inventors: Marvin J. Mohlenkamp, Jr., Cincinnati; Phillip F. Pflaumer, Hamilton, both of Ohio

[73] Assignee: The Procter & Gamble Company, Cincinnati, Ohio

[ * ] Notice: The portion of the term of this patent subsequent to Aug. 20, 2008 has been disclaimed.

[21] Appl. No.: 762,047

[22] Filed: Sep. 18, 1991

Related U.S. Application Data

[63] Continuation of Ser. No. 454,201, Dec. 21, 1989, abandoned.

[51] Int. Cl.$^5$ .............................................. A23D 9/00
[52] U.S. Cl. .................................. 426/601; 426/603; 426/607; 426/658; 536/1.1
[58] Field of Search ............... 426/601, 603, 606, 607, 426/611, 548, 658; 536/11

[56] References Cited

U.S. PATENT DOCUMENTS

| | | |
|---|---|---|
| 3,353,964 | 11/1967 | Seiden . |
| 3,450,819 | 6/1969 | Babayan et al. . |
| 3,766,165 | 10/1973 | Rennhard . |
| 3,876,794 | 4/1975 | Rennhard . |
| 4,379,782 | 4/1983 | Staub et al. . |
| 4,431,681 | 2/1984 | Hegedus et al. . |
| 4,607,052 | 8/1986 | Mendy et al. ........................ 514/547 |
| 4,622,233 | 11/1986 | Torres ................................. 426/548 |
| 4,668,519 | 3/1987 | Dartey et al. ....................... 426/548 |
| 4,678,672 | 7/1987 | Dartey et al. ........................ 426/19 |
| 4,789,664 | 12/1988 | Seligson et al. ............... 426/601 X |
| 4,810,516 | 3/1989 | Kong-Chan ........................ 426/548 |
| 4,814,195 | 3/1989 | Yokoyama et al. ................. 426/633 |
| 4,818,553 | 4/1989 | Holscher et al. ................... 426/549 |
| 4,888,196 | 12/1989 | Ehrman et al. ..................... 426/601 |
| 5,041,541 | 8/1991 | Mazur . |

FOREIGN PATENT DOCUMENTS

| | | |
|---|---|---|
| 0322027 | 12/1987 | European Pat. Off. . |
| 265699 | 5/1988 | European Pat. Off. . |
| 322027 | 6/1989 | European Pat. Off. . |
| 341062 | 11/1989 | European Pat. Off. . |
| 341063 | 11/1989 | European Pat. Off. . |

OTHER PUBLICATIONS

PCT application 91/03944 to Givens et al., published Apr. 4, 1991.
Cridland, "Developments in Dietetic Chocolate," Confectionery Manufacturing & Marketing.
Menz, "Polymorphism of Diacid Triglycerides of the Stearic Acid and Behenic Acid Series," Fette Seifen Anstrichmittel, vol. 77, No. 5 (1975), pp. 170–173.
Barnett, "Try New Calorie Polydextrose in Low Calorie Candies," Candy Industry (1986), pp. 32–38.
"Special Report: Sweeteners and Product Development," Food Technology (1986), pp. 129–130.
Critical Reviews in Food Science and Nutrition, vol. 11, Issue 4 (1979), pp. 410–411.

Primary Examiner—Joseph Golian
Assistant Examiner—Leslie Wong
Attorney, Agent, or Firm—Eric W. Guttag; Ronald L. Hemingway; Richard C. Witte

[57] ABSTRACT

Fat-containing and sugar-containing food compositions which comprise: (1) from about 2 to about 98% of a fat component having from about 10 to 100% of certain reduced calorie fats, and (2) from about 2 to about 98% of a sugar component having from about 10 to about 100% of certain reduced calorie sugars are disclosed. Examples of such compositions include flavored confectionery fat products, such as chocolate-flavored candy bars, chocolate-flavored coatings for enrobed products and chocolate-flavored chips, baked good products, such as cakes, brownies and cookies, and emulsified oil products such as margarines and salad dressings.

30 Claims, No Drawings

FOOD COMPOSITIONS CONTAINING REDUCED CALORIE FATS AND REDUCED CALORIE SUGARS

This is a continuation of application Ser. No. 454,201, filed on Dec. 21, 1989 and now abandoned.

TECHNICAL FIELD

This application relates to food compositions containing certain reduced calorie fats and certain reduced calorie sugars. This application particularly relates to flavored confectionery fat products, baked good products and emulsified oil products which contain such fats and sugars.

There are a variety of food products which contain both fats and sugars. For example, chocolate-flavored confectionery products comprise cocoa butter or a cocoa butter fat substitute, and sugar, typically in the form of sucrose. Other examples of such products are baked goods such as cookies, brownies and cakes and frozen desserts such as ice cream.

The fat and sugar components in such products can provide a significant number of calories. In the case of fat, the caloric load is due to the triglycerides that are present. For example, a natural fat, such as corn oil, provides a caloric density of about 9 calories per gram. By comparison, vegetable protein provides only about 4 calories per gram.

A number of solutions have been proposed for replacing the fat component in such products. For example, gums and other thickeners are typically used to replace a portion of the fat component by increasing the amount of water that is present. However, these substitutes often have a number of undesirable properties, particularly in the textural and flavor area. Accordingly, it would be desirable to substitute for higher calorie fats other materials which have reduced calories, but still provide the textural and flavor properties of fat.

In the case of sugars, sucrose is often used in such products. It is well known that sucrose imparts a significant number of calories to such food products. The caloric density of sucrose is about 4 calories per gram. In addition, certain diseases, in particular diabetes, require the affected person to restrict their intake of sucrose and other sugars.

A variety of high intensity, reduced calorie sweeteners have been developed to replace sugar. Prominent examples of such reduced calorie sweeteners are aspartame and acesulfame. While these materials can replace the sweetness component, they are totally incapable of providing the other functional properties of sugar. These other functional properties include water activity ($a_w$) reduction, control of starch gelatinization temperature, and viscosity.

A variety of bulking or bodying agents have been proposed to replace sugars to provide these other functional properties. These bulking agents include cellulosic derivatives such as carboxymethylcellulose, hydrocolloid gums and certain wholly or partially nondigestible carbohydrates. A prominent example of such partially nondigestible carbohydrates is the polyglucose derivative referred to as polydextrose. See U.S. Pat. No. 3,766,165 to Rennhard, issued Oct. 16, 1973, which discloses the use of polydextrose, and its related polyglucose derivatives, as non-nutritive carbohydrate substitutes in a variety of food products, including cakes, dietetic ice cream, low calorie salad dressings, chocolate coating formulations, whipped toppings and french salad dressings.

Polydextrose does not behave like a simple sugar and particularly does not have the same baking properties as sugars. Instead, it functions more as a filler or viscosity controlling agent, much like starch dextrins. Polydextrose works very well in low water systems such as hard candies. However, in intermediate water containing baked goods systems such as brownies and cookies, polydextrose does not work very well. Polydextrose can also be used in high water systems such as cakes and ice creams, but requires strict formulation control. Accordingly, it would be desirable to have a reduced calorie substitute for sugar that provides its functional properties in a variety of food products without requiring strict formulation control.

BACKGROUND ART

A. The Use of Polydextrose as a Non-Nutritive Carbohydrate Bulking Agent in Chocolate and Other Fat-Containing Food Products U.S. Pat. No. 3,766,165 to Rennhard, issued Oct. 16, 1973, discloses the use of polydextrose and its related polyglucose derivatives as non-nutritive carbohydrate substitutes. Fat-containing food product uses specifically disclosed include cakes, dietetic ice cream, low calorie salad dressings, chocolate coating formulations, whipped toppings and french salad dressings. See also U.S. Pat. No. 3,876,794 to Rennhard, issued Apr. 8, 1975 for a similar disclosure.

There are a number of other references which disclose the use of polydextrose in fat-containing food products. See, for example, Cridland, "Developments in Dietetic Chocolate," *Confectionery Manufacturing & Marketing*, (use of polydextrose as a low calorie bulking agent to replace sucrose in chocolate products); U.S. Pat. No. 4,810,516 to Kong-Chan, issued Mar. 7, 1989 (reduced calorie chocolate confections containing sucrose polyesters, artificial sweeteners such as aspartame and a wholly or partially digestible carbohydrate bulking agent such as polydextrose); U.S. Pat. No. 4,814,195 to Yokoyama et al, issued Mar. 21, 1989 (reduced calorie peanut butter products containing solid low calorie bulking agents, preferably polydextrose); U.S. Pat. No. 4,818,553 to Holscher et al, issued Apr. 4, 1989 (bakery products containing a water-in-oil emulsion shortening phase, flour, eggs, leavening agents and a low calorie bulking agent, preferably polydextrose, as a partial replacement for sucrose).

B. Short Chain and Medium Chain Fatty Acid Triglycerides of 1-Monostearin and 1-Monobehenin Menz, "Polymorphism of Diacid Triglycerides of the Stearic Acid and Behenic Acid Series," *Fette Seifen Anstrichmittel*, Vol. 77, No. 5 (1975), pp. 170–73, discloses a study of the polymorphic properties of 1-monostearin and 1-monobehenin which have been esterified with $C_2$, $C_4$, $C_6$ or $C_8$ short/medium chain saturated fatty acids.

DISCLOSURE OF THE INVENTION

The present invention relates to fat-containing and sugar-containing food compositions which comprise: (1) from about 2 to about 98% of a fat component having from about 10 to 100% of a certain reduced calorie fat; and (2) from about 2 to about 98% of a sugar component having from about 10 to about 100% of a certain reduced calorie sugar. The reduced calorie fat present in this fat component comprises: at least about 15% reduced calorie triglycerides selected from the group consisting of MML, MLM, MLL and LML triglycerides, and mixtures thereof, wherein M=fatty acids selected from the group consisting of $C_6$ to $C_{10}$ saturated fatty acids, and mixtures thereof, and L=fatty acids selected from the group consisting of $C_{17}$ to $C_{26}$ saturated fatty acids, and mixtures thereof, and wherein the fat has the following fatty acid composition by weight percent:

(a) from about 15 to about 70% $C_6$ to $C_{10}$ saturated fatty acids; and (b) from about 10 to about 70% $C_{17}$ to $C_{26}$ saturated fatty acids.

The reduced calorie sugars present in the sugar component are the 5-C-hydroxymethyl hexose compounds and their derivatives.

All weights, ratios, and percentages herein are by weight unless otherwise specified.

A. REDUCED CALORIE FAT

The reduced calorie fats used in the present invention comprise at least about 15% reduced calorie triglycerides selected from the group consisting of MML, MLM, MLL, and LML triglycerides, and mixtures thereof; wherein M=fatty acids selected from the group consisting of $C_6$ to $C_{10}$ saturated fatty acids, and mixtures thereof, and L=fatty acids selected from the group consisting of $C_{17}$ to $C_{26}$ saturated fatty acids, and mixtures thereof; and wherein the fat has the following fatty acid composition by weight percent:

(a) from about 15 to about 70% $C_6$ to $C_{10}$ saturated fatty acids; and (b) from about 10 to about 70% $C_{17}$ to $C_{26}$ saturated fatty acids.

Preferred reduced calorie fats having fatty acid compositions which comprise:

(c) not more than about 10% fatty acids selected from the group consisting of $C_{12:0}$ and $C_{14:0}$, and mixtures thereof;

(d) not more than about 20% fatty acids selected from the group consisting of $C_{18:1}$, $C_{18:2}$, $C_{18:3}$, and mixtures thereof; and (e) not more than 4% $C_{18:2}$ fatty acids. See U.S. application Ser. No. 329,620 to Paul Seiden, filed Mar. 28, 1989 (herein incorporated by reference), which discloses these reduced calorie fats and their preparation.

By "medium chain fatty acids," as used herein, is meant $C_{6:0}$ (caproic), $C_{8:0}$ (caprylic), or $C_{10:0}$ (capric) fatty acids, or mixtures thereof. The $C_7$ and $C_9$ saturated fatty acids are not commonly found, but they are not excluded from the possible medium chain fatty acids. The present medium chain fatty acids do not include lauric acid ($C_{12:0}$), sometimes referred to in the art as a medium chain fatty acid.

By "long chain fatty acids," as used herein, is meant $C_{17:0}$ (margaric), $C_{18:0}$ (stearic), $C_{19:0}$ (nonadecylic), $C_{20:0}$ (arachidic), $C_{21:0}$ (heneicosanoic), $C_{22:0}$ (behenic), $C_{23:0}$ (tricosanoic), $C_{24:0}$ (lignoceric), $C_{25:0}$ (pentacosanoic), or $C_{26:0}$ (cerotic) fatty acids, or mixtures thereof.

In the above listing of fatty acid moieties, the common name of the fatty acid is given following its $C_{x:y}$ designation (wherein x is the number of carbon atoms, and y is the number of double bonds).

By "MML," as used herein, is meant a triglyceride containing a long chain fatty acid in the #1 or #3 position (an end position) with two medium chain fatty acids in the remaining two positions. (The absorption of long chain saturated fatty acids is generally reduced in the end positions.) Similarly, "MLM" represents a triglyceride with a long chain fatty acid in the #2 position (the middle position) and two medium chain fatty acids in the #1 and #3 positions, "MLL" represents a triglyceride with a medium chain fatty acid in the #1 or #3 position and two long chain fatty acids in the remaining two positions, and "LML" represents a triglyceride with a medium chain fatty acid in the #2 position and two long chain fatty acids in the #1 and #3 positions.

The key to these reduced calorie fats is their combination of particular long chain fatty acid moieties with medium chain fatty acid moieties. The medium chain fatty acids lower the melting point of the fats, and different fatty acid combinations can be used to control the fats' physical properties for specific food applications. This results in a good-tasting fat having good mouthmelt, texture and flavor display.

Moreover, because they do not taste waxy, these reduced calorie fats can be used in a wide variety of food products, and at higher concentrations in the products to afford a greater calorie reduction. This is in contrast to the more limited use of a more waxy-tasting triglyceride, e.g., a triglyceride containing lauric acid and long chain fatty acids. This nonwaxy taste benefit is particularly evident in chocolate products made with preferred reduced calorie fats. As measured by differential scanning calorimetry (DSC), chocolate products containing these preferred fats are completely melted at a temperature of from 94° to 96° F. (34.4° to 35.6° C.). Most of the melting of these chocolate products also occurs in the fairly narrow temperature range of from 80° to 94° F. (26.7° to 34.4° C.).

Another advantage of these reduced calorie fats is that they typically contain only limited amounts of saturated $C_{12}$ to $C_{16}$ fatty acids. Ingestion of large amounts of these fatty acids is known to promote hypercholesterolemia.

These reduced calorie fats also provide some of the benefits of medium chain triglycerides. For example, the medium chain fatty acids are readily hydrolyzed from the triglycerides. These hydrolyzed medium chain fatty acids are absorbed and then transported directly to the liver (via the hepatic portal vein) where they are extensively oxidized to provide a rapid energy source.

These reduced calorie fats permit an at least about 10% reduction in calories, and preferably an at least about 30% reduction in calories over typical chain length triglycerides (i.e., corn oil), and usually between about 20% and 50% reduction in calories.

For the purposes of the present invention, the reduction in calories provided by these reduced calorie fats is based on the net energy gain (in Kcal) of rats that have ingested a diet containing the reduced calorie fats, relative to the net energy gain (in Kcal) of rats that have ingested an identical diet, but containing corn oil instead of the reduced calorie fat. The test diets used are nutritionally adequate to support both maintenance and growth of the rats. Total food intake and fat/oil intake are also matched between the two diet groups so that differences in net carcass energy gain are due entirely to the utilizable energy content of the fat/oil. "Net energy gain" is based on the total carcass energy (in Kcal) of the rat fed the test diet for some period of time (usually 4 weeks), reduced by the mean starting carcass energy (in Kcal) determined from a study of a different group of rats of the same sex, strain, and similar body weight fed a test diet that does not contain the fat/oil. "Total carcass energy" is determined by the dry carcass energy per gram (Kcal per gram) multiplied by the dry weight of the carcass (in grams). "Carcass energy per gram" is based on the carcass energy (in Kcal) as determined by bomb calorimetry of a homogeneous sample of the total dry carcass. All of these energy values are the average of a representative sample of rats (i.e., 10 rats).

These reduced calorie fats will preferably contain not more than about 5%, and most preferably not more than about 0.5%, $C_{6:0}$ fatty acid. It is also preferred that the fat contain not more than about 20% saturated $C_{24}$ to $C_{26}$ fatty acids, and most preferably not more than about 10%. Preferred reduced calorie fats of the present invention comprise from about 30 to about 60% $C_8$ to $C_{10}$ saturated fatty acids and from about 30 to about 60% $C_{18}$ to $C_{22}$ saturated fatty acids.

These reduced calorie fats can contain limited amounts of other fatty acids besides medium and long chain fatty acids, without losing the desired benefits. Palmitic acid ($C_{16:0}$) is about 95% absorbed by the body, while the longer chain fatty acids are less absorbed. Therefore, it is preferred that these reduced calorie fats contain not more than about 10% $C_{16:0}$ fatty acid. These reduced calorie fats will also preferably contain not more than about 6% fatty acids selected from the group consisting of $C_{18:1}$, $C_{18:2}$, $C_{18:3}$, and mixtures thereof, more preferably not more than about 1%, and most preferably not more than about 0.5%. Preferred reduced calorie fats also contain not more than about 3%, and more preferably not more than about 1% fatty acids selected from the group consisting of $C_{12:0}$ (lauric) and $C_{14:0}$ (myristic), and mixtures thereof. Lauric and myristic acid result in more fat deposition than medium chain fatty acids.

For optimum taste and calorie reduction, it is also preferred that these reduced calorie fats comprise at least about 30% of the triglycerides containing combinations of medium and long chain fatty acids (i.e., MML, MLM, MLL and LML triglycerides), more preferably at least about 50% of these triglycerides, and most preferably at least about 80% of these triglycerides. Preferred reduced calorie fats comprise at least about 10% of a mixture of MML and MLM triglycerides, more preferably at least about 35% of such combined triglycerides, and most preferably at least about 70% of such combined triglycerides. Preferred reduced calorie fats also comprise not more than about 40% combined MLL and LML triglycerides, more preferably not more than about 20% combined MLL and LML triglycerides, and most preferably not more than about 5% combined MLL and LML triglycerides. For most uses, these preferred reduced calorie fats also comprise minimized levels of MMM triglycerides and LLL triglycerides. By "MMM," as used herein, is meant a triglyceride containing medium chain saturated fatty acid residues at all three positions. Similarly, "LLL" represents a triglyceride containing long chain saturated fatty acid residues at all three positions. These preferred reduced calorie fats comprise not more than about 15%, more preferably not more than about 10%, and most preferably not more than about 5% MMM triglycerides. These preferred reduced calorie fats also comprise not more than about 5%, more preferably not more than about 2%, and most preferably not more than about 1% LLL triglycerides. However, for ice creams and ice cream coatings, these reduced calorie fats preferably comprise from about 10 to about 15% MMM triglycerides.

Certain of these reduced calorie fats are particularly preferred for chocolate and other confectionery products. These particularly preferred reduced calorie fats comprise at least about 85% of a mixture of MML and MLM triglycerides, more preferably at least about 90% of such combined triglycerides, and most preferably at least about 94% of such combined triglycerides. These preferred reduced calorie fats also comprise no more than about 5% combined MLL and LML triglycerides, more preferably no more than about 2% MLL and LML triglycerides, and most preferably no more than about 1% combined MLL and LML triglycerides. These particularly preferred reduced calorie fats further comprise no more than about 4%, preferably no more than about 2% and most preferably no more than about 1% MMM triglycerides, and no more than about 2%, preferably no more than about 1% and most preferably no more than about 0.5% LLL triglycerides.

These preferred fats for chocolate and other confectionery products also have the following preferred and most preferred carbon number profiles (CNP):

| CNP | PREFERRED (%) | MOST PREFERRED (%) |
| --- | --- | --- |
| 32 or lower | <3 | <1 |
| 34 | <2 | <1 |
| 36 | <4 | <2 |
| 38 | 10–40 | 10–30 |
| 40 | 35–60 | 45–55 |
| 42 | 15–40 | 25–35 |
| 44 | <5 | <1 |
| 46 | <1 | <0.6 |
| 48 | <0.8 | <0.6 |
| 50 | <0.6 | <0.5 |
| 52 | <0.4 | <0.3 |
| 54 or higher | <0.9 | <0.4 |

The triglycerides used in these reduced calorie fats can be prepared by a wide variety of techniques such as:
(a) random rearrangement of long chain triglycerides (e.g. tristearin or tribehenin) and medium chain triglycerides;
(b) esterification of glycerol with a blend of the corresponding fatty acids;
(c) transesterification of a blend of medium and long chain fatty acid methyl esters with glycerol;
(d) transesterification of long chain fatty acid glycerol esters (e.g., glyceryl behenate) with medium chain triglycerides; and
(e) esterification of long chain fatty acid monoglycerides (e.g. monostearin or monobehenin) with medium chain fatty acids or the respective anhydrides. See U.S. application Ser. No. 452,877, to Bernard W. Kluesener, Gordon K. Stipp and David K. Yang, filed Dec. 19, 1989 (P&G Case 4073), entitled "Selective Esterification of Long Chain Fatty Acid Monoglycerides with Medium Chain Fatty Acids," especially Examples 1 and 3, and U.S. application Ser. No. 452,923, to Gordon K. Stipp and Bernard W. Kluesener, filed Dec. 19, 1989 (P&G Case 4074), entitled "Selective Esterification of Long Chain Fatty Acid Monoglycerides with Medium Chain Fatty Acid Anhydrides," especially Examples 1 and 7 (herein incorporated by reference).

Random rearrangement of triglycerides is well-known in the art, as is the esterification of glycerol with fatty acids. For discussions on these subjects, see Hamilton et al., *Fats and Oils: Chemistry and Technology*, pp. 93-96, Applied Science Publishers Ltd., London (1980), and Swern, *Bailey's Industrial Oil and Fat Products*, 3d ed., pp. 941-943 and 958-965 (1964), both disclosures incorporated by reference herein. Transesterification is also discussed generally in Bailey's at pp. 958-963.

Fatty acids per se or naturally occurring fats and oils can serve as sources of fatty acids for preparing the reduced calorie triglycerides. For example, hydrogenated soybean oil and hydrogenated high erucic acid rapeseed oil are good sources of stearic and behenic acid, respectively. Odd chain length long chain saturated fatty acids can be derived from certain marine oils. Medium chain saturated fatty acids can be obtained from coconut, palm kernel, or babassu oils. They can also be obtained from commercial medium chain triglycerides, such as the Captex 300 brand sold by Capital City Products of Columbus, Ohio.

Tribehenin, useful for making the present triglycerides, can be made from behenic acid or from fractionated methyl behenate by esterification of the acid, or by transesterification of the methyl behenate with glycerol. More importantly, blends of behenic acid and medium chain fatty acids can be esterified with glycerol. Other long chain fatty acids ($C_{18}$, $C_{20}$, etc.) can be part of the process. Similarly, methyl ester blends can also be interesterified with glycerol.

These reduced calorie fats are generally made by blending the above-described triglycerides with additional fat or oil ingredients. However, the invention is not limited by the method of preparation; other methods known to the art for making fats or oils can also be used. The fats can be refined, bleached, deodorized, or processed in other ways not inconsistent with the purposes of the invention.

These reduced calorie fats can be modified to satisfy specific product performance requirements by additional fractionation. Solvent and non-solvent crystal fractionation or fractional distillation methods (e.g. molecular distillation as described below) can be applied to optimize performance. Standard fractionation methods are discussed in Applewhite, *Bailey's Industrial Oil and Fat Products*, Vol. 3, 4th ed. (1985), pp. 1-39, John Wiley & Sons, New York, incorporated by reference herein.

Fractional distillation of these reduced calorie fats is not limited to molecular distillation, but can also include conventional distillation (continuous or batch). After synthesis of the fats, it is common to use a conventional batch distillation technique to remove most of the excess medium chain triglycerides, and then continue with molecular distillation. The vacuum requirements are not as strict, and the temperature used can be higher in conventional distillation versus molecular distillation. The conventional distillation temperature is generally between 405° F. (207° C.) and 515° F. (268.3° C.). The absolute pressure is less than 8 mm Hg, more preferably less than 2 mm Hg. The distillation is aided by sparging with steam, nitrogen or other inert gas (e.g., $CO_2$). The distillation is carried out to remove part of the excess MMM triglycerides, most of the excess MMM triglycerides, or to distill also the mono-long chain (MLM and MML) components.

Crystal fractionation of the fats can be carried out with and without solvents, with and without agitation. The crystal fractionation can be repeated several times. Crystal fractionation is particularly effective to remove high melters. Fractionation of behenic MCT without solvents can be used to remove carbon number 50 and 52 MLL and LML components, which in turn alters the melting profile of the fat.

B. REDUCED CALORIE SUGARS

The reduced calorie sugars used in the present invention are the 5-C-hydroxymethyl hexose compounds and their derivatives. See U.S. application Ser. No. 339,531 to Adam W. Mazur, filed Apr. 20, 1989 (herein incorporated by reference), which discloses these reduced calorie sugars and especially the Examples for their synthesis and U.S. application Ser. No. 337,725 to Adam W. Mazur, George D. Hiler, Jr., Gordon K. Stipp and Bernard K. Kluesener, filed Apr. 17, 1989 (herein incorporated by reference), for an alternative synthesis of the 5-C-hydroxymethyl aldohexoses.

The term "hexose" means a sugar containing six carbons. This term encompasses both aldehyde containing hexoses (aldohexoses) and ketone containing hexoses (ketohexoses).

The term "aldohexoses" refers to the group of sugars whose molecule contains six carbon atoms, one aldehyde group and five alcohol groups. The sixteen stereoisomers of the aldohexose series are D-allose, D-altrose, D-glucose, D-mannose, D-gulose, D-idose, D-galactose, D-talose, L-allose, L-altrose, L-glucose, L-mannose, L-gulose, L-idose, L-galactose and L-talose. These sugars exist in solution as an equilibrium mixture of several "tautomeric forms": a pyran-ring form; a furan-ring form; or a straight-chain aldehyde form. Tautomeric forms of D-glucose:

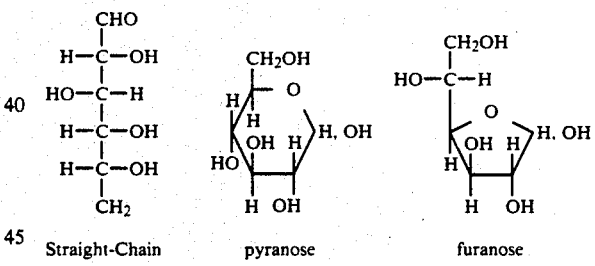

Straight-Chain     pyranose     furanose

Aldohexoses may also occur in an α or β anomeric configuration, depending on the position of the C-1 hydroxyl group. Examples are:

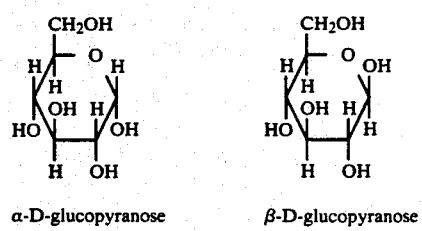

α-D-glucopyranose     β-D-glucopyranose

The term "ketohexose" refers to the group of sugars which contain six carbon atoms, one ketone group and five alcohol groups. The eight stereoisomers are D- and L- isomers of psicose, fructose, sorbose and tagatose. Like the aldohexoses, these ketohexoses can exist in solution as an equilibrium mixture of several "tautomeric forms": pyran-ring; a furan ring and a straight chain ketone form.

The term "sugar derivatives" as used herein refer to the 5-C-hydroxylmethyl derivatives of the hexoses and their stereoisomers and polymers.

The term "polyol" includes all polyhydric alcohols (i.e., those compounds of the general formula $CH_2OH(CHOH)_nCH_2OH$, where n may be from 0 to 5.). Glycerol contains three hydroxyl groups. Those with more than three are called sugar alcohols.

The 5-C-hydroxymethylaldohexose monosaccharides include the following:

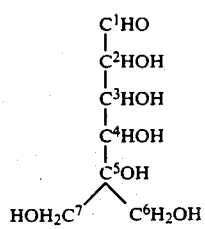

5-C-hydromethylaldohexose (straight-chain)

The preferred embodiments of the straight-chain 5-C-hydroxymethylaldohexose compounds are 5-C-hydroxymethyl derivatives of galactose, glucose, and mannose. Due to the relative ease of synthesizing galactose-based compounds, 5-C-hydroxymethyl derivative of D-galactose is the most preferred compound.

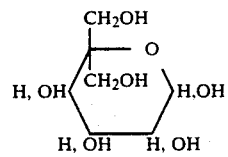

5-C-hydroxymethylaldohexopyranose

The preferred embodiments of the 5-C-hydroxymethylaldohexopyranose compounds are 5-C-hydroxymethyl derivatives of galactopyranose, -glucopyranose, and -mannopyranose. Due to the relative ease of synthesizing galactose-based compounds, the 5-C-hydroxymethyl derivative of D-galactopyranose is the most preferred compound.

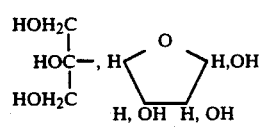

5-C-hydroxymethylaldohexofuranose

The preferred embodiments of the 5-C-hydroxymethylaldohexofuranose compounds are 5-C-hydroxymethyl derivatives of galactofuranose, -glucofuranose, and -mannofuranose. Due to the relative ease of synthesizing galactose-based compounds, the 5-C-hydroxymethyl derivative of D-galactofuranose is the most preferred embodiment.

The 5-C-hydroxymethyl-aldohexose derivatives include:

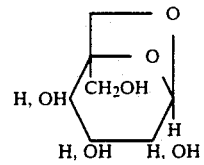

1,6-anhydro-5-C-hydroxymethyl-β-D-aldohexopyranose

The preferred embodiment of the 1,6-anhydro-5-C-hydroxymethyl-β-D-aldohexopyranose compounds is 1,6-anhydro-5-C-hydroxymethyl-β-D-galactopyranose.

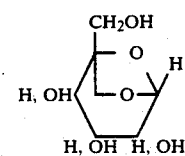

1,6-anhydro-5-C-hydroxymethyl-β-L-aldohexopyranose

The preferred embodiments of the 1,6-anhydro-5-C-hydroxymethyl-β-L-aldohexopyranose compounds are 1,6-anhydro-5-C-hydroxymethyl-β-L-altropyranose, -gulopyranose and idopyranose. The most preferred embodiment is 1,6-anhydro-5-C-hydroxymethyl-β-L-altropyranose.

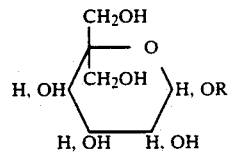

alkyl 5-C-hydroxymethyl-aldohexypyranoside where R is an alkyl group containing one to four carbon atoms.

The preferred embodiments of alkyl 5-C-hydroxymethylaldohexopyranosides are ethyl and methyl 5-C-hydroxymethylaldohexopyranoside. The most preferred embodiment is ethyl D-galactopyranoside.

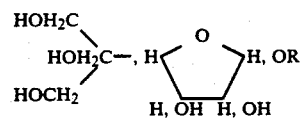

alkyl 5-C-hydroxymethylaldohexofuranoside

Where R is an alkyl group containing one to four carbon atoms.

The preferred embodiments of alkyl 5-C-hydroxymethylaldohexofuranosides are ethyl and methyl 5-C-hydroxymethylaldohexofuranoside. The most preferred embodiment is ethyl 5-C-hydroxymethyl-L-arabinohexofuranoside. (VIII) Another derivative occurs when a polyol is covalently bound by a glycoside linkage to one of the above-mentioned 5-C-hydroxymethylated saccharides. Preferred embodiments of these compounds include:

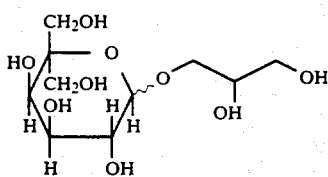

5-C-hydroxymethyl-α-L-arabino-hexopyranosyl-(1→1)-glycerol;

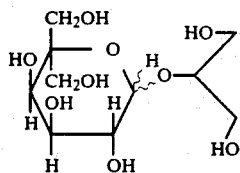

5-C-hydroxymethyl-β-L-arabino-hexopyranosyl-(1→2)-glycerol;

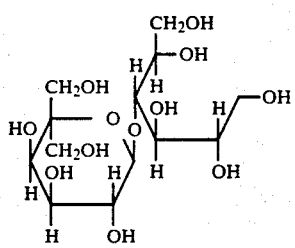

5-C-hydroxymethyl-α-L-arabino-hexopyranosyl-(1→4)-D-glucitol (a lactitol derivative).

Other monosaccharides based on the ketohexose derivatives are:

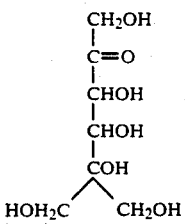 (IX)

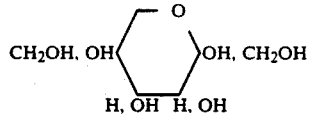 (Xa)

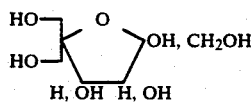 (Xb)

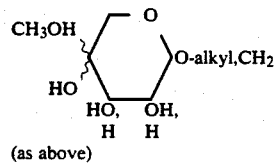 (XIa)
(as above)

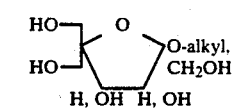 (XIb)

Preferred embodiments are 5-C-hydroxymethyl derivatives of fructose and sorbose, including alkyl glycosides, due to the availability of natural sugars.

The monosaccharides discussed above (I-XI) may also be classified as simple sugars. Simple sugar linkages are the building blocks for di-, tri-, oligo- and polysaccharides. The novel di-, tri-, oligo- and polysaccharides of the present invention contain at least one simple sugar group (i.e., monosaccharides, monosaccharide derivatives) from the monosaccharides discussed above (I-XI) or their alditols covalently bound through glycoside linkages to one or more simple sugar or simple sugar groups through any of the glycoside acceptor carbon positions (i.e., C-1 through C-7). The preferred glycoside linkages are through C-1 and C-4.

Preferred disaccharides comprise at least one simple sugar linkage selected from the group consisting of 5-C-hydroxymethylaldohexose; 1,6-anhydro-5-C-hydroxymethyl-β-D-aldohexopyranose; 1,6-anhydro-5-C-hydroxymethyl-β-L-aldohexopyranose; 5-C-hydroxymethylaldohexosyl polyol and alkyl 5-C-hydroxymethylaldohexoside, where the alkyl group is selected from the group consisting of methyl, ethyl, propyl and isopropyl.

Other preferred disaccharides comprise at least one simple sugar linkage selected from the group consisting of 5-C-hydroxymethylketohexose; 5-C-hydroxymethylketohexosyl polyol and alkyl 5-C-hydroxymethylketohexoside wherein the alkyl group is selected from the group of methyl, ethyl, propyl and isopropyl.

The following disaccharides are most preferred compounds:

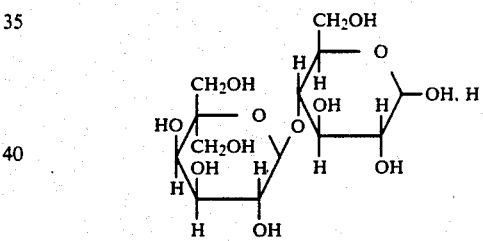

5-C-hydroxymethyl-α-L-arabino-hexopyranosyl-(1→4)-D-glucopyranose;

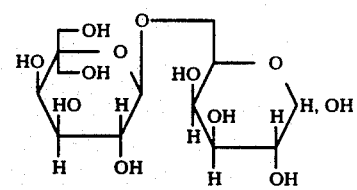

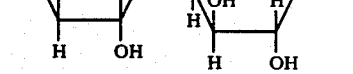

5-C-hydroxymethyl-α-L-arabino-hexopyranosyl-(1→6)-D-galactopyranose;

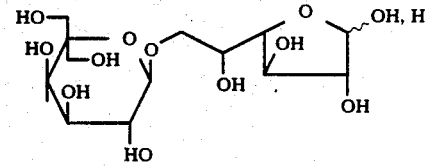

5-C-hydroxymethyl-α-L-arabino-hexopyranosyl-(1→6)-(α + β)-D-galactofuranose; and
5-C-hydroxymethyl-α-D-xylo-hexopyranosyl-β-D-fructofuranoside (a sucrose derivative).

The preferred disaccharides containing 5-C-hydroxymethyl keto hexoses are:

Ketohexose Derivatives Disaccharides

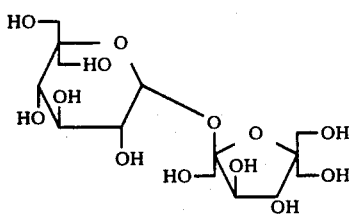

(A) α-D-glucopyranosyl-5-C-hydroxymethyl-β-D-erythro-hexulofuranoside (B) 5-C-hydroxymethyl-α-D-xylo-hexopyranosyl-5-C-hydroxy methyl-β-D-erythrohexulofuranoside The preferred trisaccharides comprise at least one simple sugar linkage selected from the group consisting of 5-C-hydroxymethylaldohexose; 1,6-anhydro-5-C-hydroxymethyl-β-D-aldohexopyranose; 1,6-anhydro-5-C-hydroxymethyl-β-L-aldohexopyranose; 5-C-hydroxymethylaldohexosyl polyol derivatives and alkyl 5-C-hydroxymethyl-D-aldohexoside, where the alkyl is selected from the group consisting of methyl, ethyl, propyl and isopropyl. The most preferred trisaccharide embodiment is:

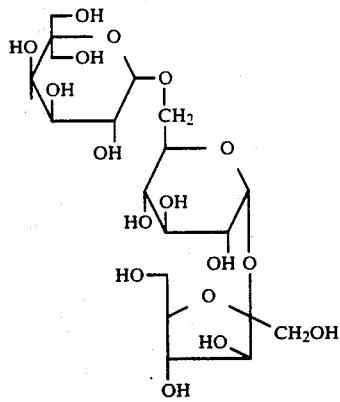

5-C-hydroxymethyl-β-L-arabino-hexopyranosyl-α-D-glucosyl-β-D-fructofurnoside (a raffinose derivative).

Preferred oligosaccharides comprise at least one simple sugar linkage selected from the group consisting of 5-C-hydroxymethylaldohexose; 1,6-anhydro-5-C-hydroxymethyl-β-D-aldohexopyranose; 1,6-anhydro-5-C-hydroxymethyl-β-L-aldohexopyranose; 5-C-hydroxymethylaldohexosyl polyol derivatives and alkyl 5-C-hydroxymethylaldohexoside, where the alkyl group is selected from the group consisting of methyl, ethyl, propyl and isopropyl.

The most preferred oligosaccharide embodiment is:

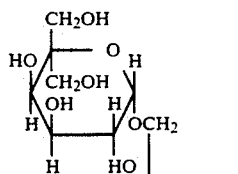
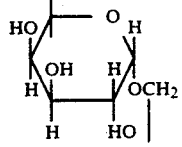
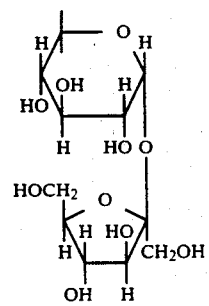

5-C-hydroxymethyl-α-D-galactosyl-α-D-galactosyl- α-D-glucosyl-β-D-fructose (a stachyose derivative).

The preferred polysaccharides comprise at least one simple sugar linkage selected from the group consisting of 5-C-hydroxymethylaldohexose; 1,6-anhydro-5-C-hydroxymethyl-β-D-aldohexopyranose; 1,6-anhydro-5-C-hydroxymethyl-β-L-aldohexopyranose; 5-C-hydroxymethylaldohexosyl polyol derivatives; alkyl 5-C-hydroxymethylaldohexoside, 5-C-hydroxymethylketohexose, 5-C-hydroxylmethylketohexosyl polyol derivatives and alkyl 5-C-hydroxymethylketohexoside where the alkyl is selected from the group consisting of methyl, ethyl, propyl and isopropyl. Finally, the most preferred polysaccharide embodiment is an arabinogalactan derivative wherein at least one D-galactosyl component is replaced with a 5-C-hydroxymethyl-α-L-arabinopyranosyl group.

C. FAT-CONTAINING AND SUGAR-CONTAINING FOOD COMPOSITIONS

The fat-containing and sugar-containing food compositions of the present invention comprise: (1) from about 2 to about 98% (more typically from about 5 to about 95%) of a fat component; and (2) from about 2 to about 98% (more typically from about 5 to about 95%) of a sugar component. The particular level of fat component and sugar component that can be present in these food compositions will vary greatly depending on the particular food product involved. For example, for baked good products, these compositions typically comprise from about 5 to about 30% fat component, and from about 20 to about 60% sugar component. In the case of flavored confectionery fat products, these compositions typically comprise from about 10 to about 45% fat component and from about 20 to about 90% sugar component. In the case of emulsified oil products, these compositions typically comprise from about 20 to about 90% fat component and from about 2 to about 20% sugar component.

The fat component of these food compositions comprises the reduced calorie fats described in part A of this application, in whole or in part. The particular level of reduced calorie fat which is present in this fat component can vary widely depending upon the food product involved, and particularly the reduced calorie benefits desired. Typically, the fat component comprises from about 10 to 100% reduced calorie fat. Preferably, the fat component comprises from about 30 to 100%, and most preferably from about 50 to 100%, reduced calorie fat.

In addition to the reduced calorie fats, the fat component of the present invention can include other regular calorie fats and oils. Suitable sources of regular fats and oils include, but are not limited to: (1) vegetable fats and oils such as soybean, corn, sunflower, rapeseed, low erucic acid rapeseed, canola, cottonseed, olive, safflower, and sesame seed; (2) meat fats such as tallow or lard; (3) marine oils; (4) nut fats and oils such as coconut, palm, palm kernel, or peanut; (5) milkfat; (6) cocoa butter and cocoa butter substitutes such as shea, or illipe butter; and (7) synthetic fats.

The sugar component of these food compositions comprises the reduced calorie sugars described in part B of this application, in whole or in part. The particular level of reduced calorie sugar that can be present in the carbohydrate component will depend upon the food product involved, and particularly the reduced calorie benefits desired. Typically, the sugar component comprises from about 10 to 100% reduced calorie sugars. Preferably, the sugar component comprises from about 30 to 100%, and most preferably from about 50 to 100%, reduced calorie sugars.

In addition to the reduced calorie sugars, the sugar component of the present invention can include regular calorie sugars. These regular calorie sugars include, but are not limited to high maltose corn syrups, high fructose corn syrups, sucrose, fructose, glucose, and maltose, and sugar alcohols such as sorbitol, xylitol and mannitol, etc.

The fat-containing and sugar-containing food compositions of the present invention are particularly suitable in formulating reduced calorie flavored confectionery fat compositions, particularly chocolate-flavored confectionery fat compositions, such as chocolate-flavored candy bars, chocolate-flavored coatings for enrobed products and chocolate-flavored chips. Particularly preferred examples of such flavored confectionery compositions comprise:

a. a flavor enhancing amount of a flavor component;
b. from about 25 to about 45% of a fat component comprising:
  (1) at least about 70% of a reduced calorie fat having:
    (a) at least about 85% combined MLM and MML triglycerides;
    (b) no more than about 5% combined MLL and LML triglycerides;
    (c) no more than about 2% LLL triglycerides;
    (d) no more than about 4% MMM triglycerides;
    (e) no more than about 7% other triglycerides;
  wherein M is a $C_6$ to $C_{10}$ saturated fatty acid residue and L is a $C_{20}$ to $C_{24}$ saturated fatty acid residue;
    (f) a fatty acid composition having:
      (i) from about 40 to about 60% combined $C_8$ and $C_{10}$ saturated fatty acids,
      (ii) a ratio of $C_8$ to $C_{10}$ saturated fatty acids of from about 1:2.5 to about 2.5:1,
      (iii) from about 40 to about 60% behenic fatty acid,
  (2) up to about 15% milkfat;
  (3) up to about 20% cocoa butter;
  (4) no more than about 4% diglycerides; and
c. from about 35 to about 60% of a sugar component having from about 50 to 100% reduced calorie sugars as described in part B of this application.

These compositions are preferably tempered according to the process disclosed in U.S. Pat. No. 4,888,196, to Ehrman et al, issued Dec. 19, 1989, which is incorporated by reference. This process comprises the following steps:

(I) forming a temperable flavored confectionery composition as defined above;
(II) rapidly cooling the composition of step (I) to a temperature of about 57° F. or less so that the reduced calorie fat forms a sub $\alpha$ phase;
(III) holding the cooled composition of step (II) at a temperature of about 57° F. or less for a period of time sufficient to form an effective amount of $\beta$-3 crystals from a portion of the sub $\alpha$ phase of the reduced calorie fat; and
(IV) after step (III), warming the cooled composition to a temperature in the range of from above about 57° to about 72° F. in a manner such that: (a) the remaining portion of the reduced calorie fat transforms into a stable $\beta$-3 phase; and (b) the $\beta$-3 phase formed does not melt.

Certain of the reduced calorie fats, like cocoa butter, can be crystallized into a stable $\beta$-3 phase. However, it has been found that the rate of crystallization of these reduced calorie fats into the $\beta$-3 phase is extremely slow under standard tempering conditions used with cocoa butter-based chocolate products. This rate is sufficiently slow so as to make cocoa butter-type tempering of flavored confectionery compositions containing these reduced calorie fats commercially unattractive.

Surprisingly, it has been found that tempering according to U.S. Pat. No. 4,888,196 provides a commercially attractive process that is simpler than even the standard tempering conditions used with cocoa butter-based chocolate products. In particular, this tempering process can be carried out during the normal warehousing and distribution of the flavored confectionery product. These desirable results are achieved by taking advantage of the ability of these reduced calorie fats to transform into the desired stable $\beta$-3 phase, via the less stable sub $\alpha$ phase. This transformation of the reduced calorie fats from the sub $\alpha$ phase to the stable $\beta$-3 phase according to this tempering process occurs without undesired bloom formation. The resulting tempered products also have the desired firmness and mouthmelt of cocoa butter-based chocolate products.

The fat-containing and sugar-containing food compositions of the present invention are also particularly suitable in the formulation of baked good products. As used herein, the term "baked goods" refers to all manner of foods which are cooked (i.e., prepared using heat). These baked goods include, but are not limited to, foods prepared using dry heat (i.e., a radiant or convection oven), fried foods, boiled foods and foods heated in a microwave oven. These baked goods can be in any form such as mixes, shelf-stable baked goods, and frozen baked goods. For baked good products of the present invention, the reduced calorie sugars used need to be the trisaccharide, oligosaccharide, polysaccharide, and preferably disaccharide versions of the 5-C-hydroxymethyl hexoses, and their derivatives.

Suitable baked good products according to the present invention include, but are not limited to, cakes, brownies, muffins, bar cookies, wafers, biscuits, pastries, pies, piecrusts, and cookies, including sandwich cookies and chocolate chip cookies, particularly the storage-stable dual-textured cookies described in U.S. Pat. No. 4,455,333 to Hong et al, issued Jun. 19, 1984. These baked good products can contain food, creme, or other fillings. Other baked good uses include breads and rolls, crackers, pretzels, pancakes, waffles, ice cream cones and cups, yeast-raised baked goods, pizzas and pizza crust, baked farinaceous snack foods, and other baked salted snacks.

Other examples of fat-containing and sugar-containing food compositions of the present invention include, but are not limited to: emulsified oil products such as margarines, salad dressings and mayonnaise-like products, ice cream and other frozen desserts, whipped toppings, frostings and icings.

The food compositions of the present invention can also be fortified with vitamins and minerals, particularly the fat-soluble vitamins. U.S. Pat. No. 4,034,083 to Mattson, issued Jul. 5, 1977 (incorporated by reference herein) discloses polyol fatty acid polyesters fortified with fat-soluble vitamins. The fat-soluble vitamins include vitamin A, vitamin D, vitamin E, and vitamin K. Vitamin A is a fat-soluble alcohol of the formula $C_{20}H_{29}OH$. Natural vitamin A is usually found esterified with a fatty acid; metabolically active forms of vitamin A also include the corresponding aldehyde and acid. Vitamin D is a fat-soluble vitamin well known for use in the treatment and prevention of rickets and other skeletal disorders. Vitamin D comprises sterols, and there are at least 11 sterols with vitamin D-type activity. Vitamin E (tocopherol) is a third fat-soluble vitamin which can be used in the present invention. Four different tocopherols have been identified (alpha, beta, gamma and delta), all of which are oily, yellow liquids, insoluble in water but soluble in fats and oils. Vitamin K exists in at least three forms, all belonging to the group of chemical compounds known as quinones. The naturally occurring fat-soluble vitamins are $K_1$ (phylloquinone), $K_2$ (menaquinone), and $K_3$ (menadione). The amount of the fat-soluble vitamins employed herein to fortify the present food compositions can vary. If desired, the food compositions can be fortified with a recommended daily allowance (RDA), or increment or multiple of an RDA, of any of the fat-soluble vitamins or combinations thereof.

Vitamins that are nonsoluble in fat can similarly be included in the present food compositions. Among these vitamins are the vitamin B complex vitamins, vitamin C, vitamin G, vitamin H, and vitamin P. The minerals include the wide variety of minerals known to be useful in the diet, such as calcium, magnesium, and zinc. Any combination of vitamins and minerals can be used in the present food compositions.

Due to the relative low sweetness intensity of the reduced calorie sugars described in part B of this application, noncaloric or reduced calorie sweeteners are typically included in the food compositions of the present invention. Noncaloric or reduced calorie sweeteners include, but are not limited to, aspartame; saccharin; alitame, thaumatin; dihydrochalcones; cyclamates; steviosides; glycyrrhizins, synthetic alkoxy aromatics, such as Dulcin and P-4000; sucralose; suosan; miraculin; monellin; sorbitol, xylitol; talin; cyclohexylsulfamates; substituted imidazolines; synthetic sulfamic acids such as acesulfame, acesulfam-K and n-substituted sulfamic acids; oximes such as perilartine; rebaudioside-A; peptides such as aspartyl malonates and succanilic acids; dipeptides; amino acid based sweeteners such as gem-diaminoalkanes, meta-aminobenzoic acid, L-aminodicarboxylic acid alkanes, and amides of certain alpha-aminodicarboxylic acids and gem-diamines; and 3-hydroxy-4-alkyloxyphenyl aliphatic carboxylates or heterocyclic aromatic carboxylates.

Bulking or bodying agents can also be included in the food compositions of the present invention. The bulking agents can be nondigestible carbohydrates, for example, polydextrose and cellulose or cellulose derivatives, such as carboxymethylcellulose, carboxyethylcellulose, hydroxypropylcellulose, methylcellulose and microcrystalline cellulose. Other suitable bulking agents include starches, gums (hydrocolloids), fermented whey, tofu, and maltodextrins.

The food compositions of the present invention can also include dietary fibers. By "dietary fiber" is meant complex carbohydrates resistant to digestion by mammalian enzymes, such as the carbohydrates found in plant cell walls and seaweed, and those produced by microbial fermentation. Examples of these complex carbohydrates are brans, celluloses, hemicelluloses, pectins, gums and mucilages, seaweed extract, and biosynthetic gums. Sources of the cellulosic fiber include vegetables, fruits, seeds, cereals, and man-made fibers (for example, by bacterial synthesis). Commercial fibers such as purified plant cellulose, or cellulose flour, can also be used. Naturally occurring fibers include fiber from whole citrus peel, citrus albedo, sugar beets, citrus pulp and vesicle solids, apples, apricots, and watermelon rinds.

These dietary fibers may be in a crude or purified form. The dietary fiber used may be of a single type (e.g. cellulose), a composite dietary fiber (e.g. citrus albedo fiber containing cellulose and pectin), or some combination of fibers (e.g. cellulose and a gum). The fibers can be processed by methods known to the art.

The food compositions of the present invention can also contain minor amounts of optional flavorings, emulsifiers, anti-spattering agents, anti-sticking agents, anti-oxidants, or the like.

D. ANALYTICAL METHODS

1. CNP/GC Method

The carbon number profile (CNP) of the triglycerides present in the reduced calorie fat can be determined by programmed temperature-gas chromatography (GC) using a short fused-silica-column coated with methyl silicone for analysis and characterization of the composition by molecular weight. The triglycerides are separated according to their respective carbon numbers, wherein the carbon number defines the total number of carbon atoms on the combined fatty acid residues. The carbon atoms on the glycerol molecule are not counted. Glycerides with the same carbon number will elute as the same peak. For example, a triglyceride composed of three $C_{16}$ (palmitic) fatty acid residues will co-elute with triglycerides made up of one $C_{14}$ (myristic), one $C_{16}$ and one $C_{18}$ (stearic) fatty acid residue or with a triglyceride composed of two $C_{14}$ fatty acid residues and one $C_{20}$ (arachidic) fatty acid residue.

Preparation of the fat sample for analysis is as follows: 1.0 ml. of a tricaprin internal standard solution (2 microg./ml.) is pipetted into a vial. The methylene chloride solvent in the standard solution is evaporated using a steam bath under a nitrogen stream. Two drops of the fat sample (20 to 40 microg.) are pipetted into a vial. If the fat sample is solid, it is melted on a steam bath and stirred well to insure a representative sample. 1.0 ml. of bis (trimethylsilytrifluoroacetamide) (BSTFA) is pipetted into the vial which is then capped. The contents of the vial are shaken vigorously and then placed in a heating block (temperature of 100° C.) for about 5 minutes.

For determining the CNP/GC of the prepared fat samples, a Hewlett-Packard 5880A series gas chromatograph equipped with temperature programming and a hydrogen flame ionization detector is used together with a Hewlett-Packard 3351B data system. A 2 m. long, 0.22 mm. diameter fused silica capillary column coated with a thin layer of methyl silicone (Chrompak CP-SIL 5) is also used. The column is heated in an oven where temperature can be controlled and increased according to a specified pattern by the temperature programmer. The hydrogen flame ionization detector is attached to the outlet port of the column. The signal generated by the detector is amplified by an electrometer into a working input signal for the data system and recorder. The recorder prints out the gas chromatograph curve and the data system electronically integrates the area under the curve. The following instrument conditions are used with the gas chromatograph:

| | |
|---|---|
| Septum purge | 1 ml./min. |
| Inlet pressure | 5 lbs./in.2 |
| Vent flow | 75 ml./min. |
| Makeup carrier | 30 ml./min. |
| Hydrogen | 30 ml./min. |
| Air | 400 ml./min. |

1.0 microl. of the prepared fat sample is taken by a gas-tight syringe and injected into the sample port of the gas chromatograph. The components in the sample port are warmed up to a temperature of 365° C. and swept by a helium carrier gas to push the components into the column. The column temperature is initially set at 175° C. and held at this temperature for 0.5 min. The column is then heated up to a final temperature of 355° C. at a rate of 25° C./min. The column is maintained at the final temperature of 355° C. for an additional 2 min.

The chromatographic peaks generated are then identified and the peak areas measured. Peak identification is accomplished by comparison to known pure glycerides previously programmed into the data system. The peak area as determined by the data system is used to calculate the percentage of glycerides having a particular Carbon Number ($C_N$) according to the following equation:

$$\% \ C_N = (\text{Area of } C_N/S) \times 100$$

wherein S = sum of Area of $C_N$ for all peaks generated.

The Area of $C_N$ is based upon the actual response generated by the chromatograph multiplied by a response factor for glycerides of the particular Carbon Number. These response factors are determined by comparing the actual responses of a mixture of pure glycerides of various Carbon Numbers to the known amounts of each glyceride in the mixture. A glyceride generating an actual response greater than its actual amount has a response factor less than 1.0; likewise, a glyceride generating a response less than that of its actual amount has a response factor of greater than 1.0. The mixture of glycerides used (in a methylene chloride solution) is as follows:

| Component | Carbon No. | Amount (mg./ml.) |
|---|---|---|
| Palmitic acid | 16 | 0.5 |
| Monopalmitin | 16 | 0.5 |
| Monostearin | 18 | 0.5 |
| Dipalmitin | 32 | 0.5 |
| Palmitostearin | 34 | 0.5 |
| Distearin | 36 | 0.5 |
| Tripalmitin | 48 | 1.5 |
| Dipalmitostearin | 50 | 1.5 |
| Distearopalmitin | 52 | 1.5 |
| Tristearin | 54 | 1.5 |

2. Fatty Acid Composition

Principle

The fatty acid composition of the triglycerides present in the reduced calorie fat is measured by gas chromatography. First, fatty acid ethyl esters of the triglycerides are prepared by any standard method (e.g., by transesterification using sodium ethoxide), and then separated on a capillary column which is coated with DB-WAX stationary phase. The fatty acid ethyl esters are separated by chain length and degree of unsaturation. A split injection is made with flame ionization detection. Quantitation is performed by use of a double internal standard method. This method can separate fatty acid ethyl esters from $C_6$ to $C_{24}$.

Equipment

| | |
|---|---|
| Gas Chromatograph | Hewlett-Parkard 5890, or equivalent, equipped with a split injector and flame ionization detector, Hewlett-Packard Co., Scientific Instruments Div., 1601-T California Ave., Palo Alto, CA 94304 |
| Autosampler Injector | Hewlett-Packard 7673A, or equivalent |
| column | |
| Column | 15 m × 0.25 mm I.D., fused silica capillary column coated with DB-WAX (0.25 micron film thickness), Hewlett-Packard Co., Scientific Instruments Div. |
| Data System | Hewlett-Packard 3350, 3000-T Hanover St., Palo Alto, CA 94304 |
| Recorder | Kipp & Zonen, BD40, Kipp & Zonen |
| Reagent | |
| Hexane | Burdick & Jackson, or equivalent, American Scientific Products |

Reference Standards

Two reference standards are used each day of operation to verify proper operation of this method. 1) A reference mixture of fatty acid methyl esters (FAME) is used to check the operation of the instrument. This reference mixture has the following fatty acid composition: 1% $C_{14:0}$, 4% $C_{16:0}$, 3% $C_{18:0}$, 45% $C_{18:1}$, 15% $C_{18:2}$, 3% $C_{18:3}$, 3% $C_{20:0}$, 3% $C_{22:0}$, 20% $C_{22:1}$, and 3% $C_{24:0}$. 2) A reference standard of a commercial shortening is used to check the operation of the total system— ethylation and gas chromatographic analysis. The shortening reference standard has the following fatty acid composition: 0.5% $C_{14:0}$, 21.4% $C_{16:0}$, 9.2% $C_{18:0}$, 40.3% $C_{18:1}$, 23.0% $C_{18:2}$, 2.2% $C_{18:3}$, 0.4% $C_{10:0}$, 1.3% $C_{20:1}$, and 0.3% $C_{22:0}$.

The reference mixture of FAME should be diluted with hexane and then injected into the instrument. A new vial of FAME reference mixture should be opened every day since the highly unsaturated components, $C_{18:2}$ and $C_{18:3}$, oxidize easily. The shortening reference standard should be ethylated with the samples prior to their analysis by capillary gas chromatography. The results from the reference standards should be compared with the known values and a judgment made concerning the completed analysis. If the results of the reference standards are equal to or within±standard deviations of the known values, then the equipment, reagents and operations are performing satisfactorily.

Operation

A. Instrumental Set-up

1. Install the column in the gas chromatograph, and set up the instrumental conditions as in Table 4.
2. Set up the data system with the appropriate method to acquire and analyze the data. The retention times may have to be adjusted in the method due to instrument variations. Consult the data system reference manual on how to do this—HP3350 User's Reference Manual. Unity response factors are used for each component.
3. Obtain the shortening reference standard for analysis with the samples and ethylate it with the samples.

TABLE 4

| INSTRUMENTAL CONDITIONS | |
|---|---|
| Instrument | Hewlett-Packard 5890 |
| Column | 15 m × 0.25 mm I.D., coated with DB-WAX, 0.25μ film thickness |
| Column head pressure | 12.5 psi |
| Carrier gas | Helium |
| Injector "A" temperature | 210° C. |
| Split vent flow | 100 mL/min |
| Septum purge | 1.5 mL/min |
| Oven temperature profile: | |
| Initial temperature | 110° C. |
| Initial time | 1 min |
| Rate 1 | 15° C./min |
| Final temp 1 | 170° C. |
| Final time 1 | 0 min |
| Rate 2 | 6° C./min |
| Final temp 2 | 200° C. |
| Final time 2 | 0 min |
| Rate 3 | 10° C./min |
| Final temp 3 | 220° C. |
| Final time 3 | 8 min |
| Detector | FID |
| Detector temp | 230° C. |
| Make-up gas | 30 mL/min |
| Detector H$_2$ flow | 30 mL/min |
| Detector air flow | 300 mL/min |

B. Analysis of Samples - (The samples are analyzed with a double internal standard.)

1. Dilute the reference mixture of FAME with hexane. The methyl esters should be approximately 2% in hexane. Inject one microliter of this solution via the autosampler. The results must meet the criteria in the Reference Standards section.
2. Prepare the triglyceride samples to be analyzed by adding two different internal standards, $C_9$ and $C_{21}$ triglycerides. ($C_9$ and $C_{21}$ triglycerides are commercial standards consisting of 100% 9-carbon and 21-carbon triglycerides, respectively.) The internal standards are added to the samples at about 10% by weight of the sample. The samples (including the internal standards) are then converted to ethyl esters by any standard method.
3. Set up a sequence in the LAS data system to inject the samples.
4. Activate the autosampler to inject 1.0 microl. of the samples in the sequence. The gas chromatograph will automatically begin its temperature program and the data system will collect and analyze the data for the sequence.
5. The data is analyzed with the two internal standard procedure. The absolute amount (mg of esters per gram of sample) of the $C_6$ through $C_{16}$ components is calculated from the $C_9$ internal standard. The absolute amount of the $C_{18}$, $C_{20}$, $C_{22}$ and $C_{24}$ components is calculated from the $C_{21}$ internal standard. Weight percentages of fatty acids are calculated from these amounts.

E. Specific Illustrations of Fat-Containing and Sugar-Containing Food Compositions of the Present Invention The following are specific illustrations of fat-containing and sugar-containing food compositions according to the present invention:

EXAMPLE 1

A chocolate-flavored molding composition is formulated from the following ingredients:

| Ingredient | Amount (g.) |
|---|---|
| Reduced calorie fat | 1130.7 |
| Chocolate liquor | 152.0 |
| Lecithin | 4.0 |
| Cocoa powder (10–12% fat) | 208.0 |
| Whole milk solids (26% fat) | 388.0 |
| Nonfat milk solids | 140.0 |
| Vanillin | 2.0 |
| Reduced calorie sugar* | 1948.0 |
| Aspartame | q.s. |

*5-C-hydroxy methyl-α-L-arabino-hexopyranosyl-D-sorbitol

The reduced calorie fat used in this chocolate-flavored composition is prepared generally as follows: Compritol 888 (a mixture of approximately 25% monobehenin, 50% dibehenin and 25% tribehenin, sold by Gattefosse of 200 Sawmill River Road, Hawthorne, N.Y.) is further esterified at 265° C. with capric fatty acid until the diglyceride concentration of the mixture is reduced to less than 4%. The weight ratio of Compritol 888 to capric fatty acid at the start of esterification is approximately 70:30. The resulting esterified mixture is deodorized at 260° C. for 3 hours and then combined with Captex 355 (a mixture of $C_8/C_{10}$ medium chain triglycerides, sold by Capital City Products, of Columbus, Ohio) in a weight ratio of 58:42. This mixture is randomly rearranged (randomized) at a temperature of 80° C. for 20 minutes using 0.06% sodium methoxide as the catalyst, neutralized with phosphoric acid and then filtered to remove sodium phosphate. The randomized mixture (approximately 2.5% diglycerides, 38.5% medium chain (MMM) triglycerides, 43.5% mono-long chain (MLM/MML) triglycerides, 13.5% di-long chain (LLM/LML) triglycerides, and 1% tri-long chain (LLL) triglycerides), is steam stripped at a temperature of 450° to 515° F. (232.2° to 268.3° C.) during which a major portion of the medium chain triglycerides are distilled off. The stripped residue (2.5% diglycerides, 6% medium chain triglycerides, 67% mono-long chain triglycerides, and 24% di-long chain triglycerides) is then passed three times at gradually increasing temperatures through two 14 inch molecular stills (connected in series) to increase the level of mono-long chain triglycerides. The molecular stills are operated under the following conditions:
Bell jar pressure: 5-11 microns Hg. abs.
Rotor feed temperature: 125°-160° C.
Rotor residue temperature: 180°-216° C.
Initial feed pump rate: 36-40 lbs./hour
Distillation rate: 4-6 lbs./hour per unit
The distillate fractions obtained (total of 25) contain 1% medium chain triglycerides, 92% mono-long chain triglycerides, and 5-6% di-long chain triglycerides. Each of these distillate fractions are subjected to nonsolvent fractionation, first at 80° F. (26.7° C.) and then at 76° F. (24.4° C.). The liquid (olein) fractions obtained are combined to provide a reduced calorie fat having the folowing carbon number profile (CNP):

| CNP | % |
| --- | --- |
| 32 | 0.1 |
| 34 | 0.5 |
| 36 | 1.7-2.0 |
| 38 | 21.7-22.9 |
| 40 | 48.0-48.6 |
| 42 | 23.9-24.7 |
| 44 | 0.7-1.0 |
| 46 | 0.2 |
| 48 | 0.2 |
| 50 | 0.2 |
| 52 | 0.1 |

The chocolate-flavored molding composition is processed in two batches of equal size. The cocoa powder, whole milk solids, nonfat milk solids, vanillin, reduced calorie sugar and aspartame are blended, and then the melted chocolate liquor is added along with 720.8 g. of the reduced calorie fat. After blending, this mixture is refined twice using a Lehman Four-Roll Refiner (200 psi NIP pressure). This refined mix (3381.4 g.) is dry conched 2½ to 3 hours at 145° F. (62.8° C.) using a Hobart C-100 Mixer set at speed #2. An additional 257.4 g. of reduced calorie fat is added, and the temperature of the mix is then reduced to 125° F. (51.7° C.). The mix is then wet-conched at speed #1 for 17 hours.

Finally, the remaining reduced calorie fat (152.5 g.) and lecithin is added to this chocolate-flavored mixture and blended thoroughly for about 45 minutes. The temperature is then reduced to 85° to 90° F. (29.4° to 32.2° C.) and, after equilibration, the chocolate-flavored mass is weighed into bar molds in 42.6 g. portions. The molds are placed in a 50° F. (10° C.) environment with circulating air. The bars are then tempered under the following conditions:

| Temperature | | Time (hours) |
| --- | --- | --- |
| (°F.) | (°C.) | |
| 50 | 10 | 72 |
| 60 | 15.6 | 24 |
| 70 | 21.1 | 8 |
| 60* | 15.6* | 16 |

*for demolding purposes

The tempered bars were then demolded, individually wrapped in foil and stored at 70° F. (21.1° C.).

EXAMPLE 2

A chocolate-flavored molding composition is formulated from the following ingredients:

| Ingredient | Amount (g.) |
| --- | --- |
| Reduced calorie fat* | 320.8 |
| Chocolate liquor | 55.1 |
| Lecithin | 0.6 |
| Cocoa powder (10-12% fat) | 61.2 |
| Whole milk solids (26% fat) | 172.8 |
| Vanillin | 0.6 |
| Reduced calorie sugar* | 579.6 |
| Aspartame | q.s. |

*Same as Example 1

The cocoa powder, whole milk solids, vanillin, reduced calorie sugar and aspartame is blended, and then 216.1 g. of melted reduced calorie fat is added. This mixture is passed through the Lehman Four-Roll refiner (200 psi NIP pressure) twice. The melted chocolate liquor is added to the refined mix (988.1 g.) and then dry conched at 140° F. (60° C.) for 3 hours using a C-100 Hobart mixer set at speed #2. The temperature of the mix is then reduced to 120° to 125° F. (48.9° to 51.7° C.). Lecithin and more reduced calorie fat (50.0 g.) are added, and then the mix is wet-conched for 16 hours at speed #1.

An additional 54.7 g. of reduced calorie fat is then added to the wet-conched mixture. The temperature is then reduced to about 90° F. (32.2° C.), and the chocolate-flavored mass is molded into 1 oz. bars. The bars are tempered at 50° F. (10° C.) for 16-18 hours, at 60° F. (15.6° C.) for 24 hours, and then at 70° F. (21.1° C.) for 24 hours before demolding.

EXAMPLE 3

A chocolate-flavored enrobing composition is formulated from the following ingredients:

| Ingredient | Amount (g.) |
| --- | --- |
| Reduced calorie fat* | 570.4 |
| Chocolate liquor | 76.0 |
| Lecithin | 2.0 |
| Cocoa powder (10-12% fat) | 104.0 |
| Whole milk solids (26% fat) | 194.0 |
| Nonfat milk solids | 70.0 |
| Reduced calorie sugar* | 974.0 |
| Aspartame | q.s. |

*Same as Example 1.

The cocoa powder, whole milk solids, nonfat milk solids, reduced calorie sugar and aspartame are thoroughly blended, and then the melted chocolate liquor is added along with 360.4 g. of the reduced calorie fat. After thorough blending, the resultant mixture is passed through a Lehman Four-Roll Refiner twice (NIP pressure 200 psi). The refined mix (1732.6 g.) is recovered and then dry-conched 2½ to 3 hours at 145° F. (62.8° C.) using a Hobart C-100 mixer set at speed #2. After an additional 135.0 g. of the reduced calorie fat is added, the mix temperature is reduced to 125° F. (51.7° C.), and then wet-conched for about 18 hours at speed #1.

The remaining reduced calorie fat (75.0 g.) and the lecithin are then added to the wet-conched mixture and mixed thoroughly. A portion of this chocolate-flavored coating mixture (~1000 g.) is heated to 120° to 125° F.

(48.9° to 51.7° C.) and mixed at this temperature for about 60 minutes. The temperature is then reduced to about 85° F. (29.4° C.). Rectangular pieces of confectionary candy centers (caramel, peanuts and nougat) weighing about 8 or 12 g. each are dipped into this chocolate-flavored coating mixture to enrobe the centers. After draining the excess coating, the pieces are placed on trays and cooled to 50° F. (10° C.). After about 65 hours at 50° F. (10° C.), the enrobed candy products are gradually warmed to 60° F. (15.6° C.) and then held at this temperature for 17 days, followed by gradual warming to 70° F. (21.1° C.) and then holding at this temperature for 4 hours. The enrobed 8 g. centers are cut into two pieces, while the 12 g. centers are cut into three pieces, and then wrapped individually in foil for storage at 70° F. (21.1° C.).

EXAMPLE 4

A chocolate-flavored molding composition is formulated from the following ingredients:

| Ingredient | Amount (g.) |
| --- | --- |
| Reduced calorie fat* | 267.5 |
| Chocolate liquor | 22.04 |
| Lecithin | 1.2 |
| Cocoa powder (10–12% fat) | 30.16 |
| Whole milk solids (26% fat) | 56.27 |
| Nonfat milk solids | 20.30 |
| Vanillin | 0.3 |
| Reduced calorie sugar | 280.7 |
| Aspartame | 1.7 |

*Same as Example 1.

The cocoa powder, whole milk solids, nonfat milk solids, vanillin, reduced calorie sugar and aspartame are thoroughly blended, and then the melted chocolate liquor is added along with 104.5 g. of the reduced calorie fat. After thorough blending, the resultant mixture is passed through a Lehman Four-Roll Refiner twice (NIP pressure 200 psi). The refined mix (508.7 g.) is recovered and then dry-conched 3 hours at 120° to 125° F. (48.9° to 51.7° C.) using a Hobart C-100 mixer set at speed #2. After an additional 31.4 g. of the reduced calorie fat is added, the mix is then wet-conched for 16 hours at speed #1.

The remaining reduced calorie fat (31.6 g.) and the lecithin are then added to the wet-conched mixture. The temperature is then reduced to about 85° F. (29.4° C.), and the chocolate-flavored mass is molded into 1 oz. bars. The bars are tempered at 50° F. (10° C.) for 16–18 hours, at 60° F. (15.6° C.) for 24 hours, and then at 70° F. (21.1° C.) for 24 hours before demolding.

EXAMPLE 5

Preparation of brownies containing 5-C-hydroxymethyl-α-L-arabino-hexopyranosyl-D-glucitol

| Ingredient | Amount (gms) |
| --- | --- |
| 5-C-hydroxymethyl-α-L-arabino-hexopyranosyl-D-glucitol | 309.8 |
| Flour | 152 |
| Reduced calorie fat* | 50 |
| Cocoa | 35.3 |
| Starch | 11.7 |
| Conventional additives (flavors and a small amount of baking soda) | 6.2 |
| Eggs | 50 |
| Canola oil (I.V. 90) | 63 |
| Water | 80 |

*Same as Example 1

The ingredients are stirred with a large spoon until well blended (about 50 strokes or 1 minute) to form a batter. The batter is poured into a lightly greased 13"×9"×2" (33 cm.×23 cm.×5 cm.) pan, and then baked at 350° F. (176.7° C.) for about 26.5 minutes to produce the finished brownies.

EXAMPLE 6

Preparation of cookies containing 5-C-hydroxymethyl-α-L-arabinohexopyranosyl-D-glucitol

| Ingredient | Amount (gms) |
| --- | --- |
| 5-C-hydroxymethyl-α-L-arabinohexopyranosyl-D-glucitol | 176 |
| Table sugar (i.e., sucrose) | 176 |
| Flour | 328 |
| Reduced calorie fat* | 196 |
| Egg | 96 |
| Water | 20 |
| Conventional additives (flavors and a small amount of baking soda) | 8 |

*Same as Example 1

The ingredients are combined and the resulting dough is kneaded until uniform. Dough balls (10–13 gm) are individually placed on a lightly greased cookie tray and then baked at 350° F. (176.7° C.) for 7–8 minutes to produce finished cookies.

EXAMPLE 7

Preparation of a white cake containing 5-C-hydroxymethyl-α-L-arabinohexapyranosyl-D-sorbitol

| Ingredient | Amount (gms) |
| --- | --- |
| 5-C-hydroxymethyl-α-L-arabino-hexapyranosyl-D-sorbitol | 133 |
| Cake flour | 107 |
| Reduced calorie fat* | 47.5 |
| Double-acting baking powder | 6.7 |
| Milk | 130 |
| Egg whites | 60 |
| Vanilla | 2.5 |

*Same as Example 1

The ingredients are stirred with an electric mixer to form a uniform batter. The batter is poured into a lightly greased 13"×9"×2" (33 cm.×23 cm.×5 cm.) pan, and then baked at 350° F. (176.7° C.) for 40 minutes to produce the finished white cake. This cake looks like a conventional white cake, but has reduced caloric value.

EXAMPLE 8

Preparation of margarine containing 5-C-hydroxymethyl-α-L-arabino-hexapyranosyl-D-sorbitol

|  | Amount (g) |
| --- | --- |
| Oil Phase Ingredients |  |
| Canola oil (I.V. 90) | 1370 |
| Reduced calorie fat* | 600 |
| Canola hardstock (I.V. 4) | 30 |
| Color | q.s. |
| Flavor | q.s. |
| Aqueous Phase Ingredients |  |
| Water | 162.5 |
| Soluble whey protein | 25 |
| Reduced calorie sugar* | 50 |
| Aspartame | q.s. |
| Salt | 37.5 |

*Same as Example 1

The oil phase ingredients are melted and mixed together. The aqueous phase ingredients are mixed together and dissolved. The oil and aqueous phases are combined, mixed together and passed through a scraped wall heat exchanger to form an emulsified spread using standard margarine-making conditions.

What is claimed is:

1. A fat-containing and sugar-containing food composition, which comprises:
   (1) from about 2 to about 98% of a fat component having from about 10 to 100% of reduced calorie fat which comprises at least about 15% reduced calorie triglycerides selected from the group consisting of MML, MLM, MLL and LML triglycerides, and mixtures thereof, wherein M=fatty acids selected from the group consisting of $C_6$ to $C_{10}$ saturated fatty acids, and mixtures thereof, and L=fatty acids selected from the group consisting of $C_{17}$ to $C_{26}$ saturated fatty acids, and mixtures thereof, and wherein said fat has the following fatty acid composition by weight percent:
      (a) from about 15 to about 70% $C_6$ to $C_{10}$ saturated fatty acids; and
      (b) from about 10 to about 70% $C_{17}$ to $C_{26}$ saturated fatty acids; and
   (2) from about 2 to about 98% of a sugar component having from about 10 to 100% of a 5-C-hydroxymethyl hexose compound or its derivative.

2. The composition of claim 1 which comprises from about 5 to about 95% of said fat component and from about 5 to about 95% of said sugar component.

3. The composition of claim 2 wherein said fat component comprises from about 30 to 100% of said reduced calorie fat.

4. The composition of claim 3 wherein said fat component comprises from about 50 to 100% of said reduced calorie fat.

5. The composition of claim 4 wherein said reduced calorie fat comprises at least about 30% of said reduced calorie triglycerides.

6. The composition of claim 5 wherein said reduced calorie fat comprises at least about 50% of said reduced calorie triglycerides.

7. The composition of claim 6 wherein said reduced calorie fat comprises at least about 35% combined MML and MLM triglycerides and no more than about 40% combined MLL and LML triglycerides.

8. The composition of claim 7 wherein said reduced calorie fat has a fatty acid composition which comprises not more than about 5% $C_{6:0}$ fatty acid.

9. The composition of claim 8 wherein said reduced calorie fat has a fatty acid composition which comprises not more than about 20% saturated $C_{24}$ to $C_{26}$ fatty acids.

10. The composition of claim 2 wherein said sugar component comprises from about 30 to 100% of said hexose compound or its derivative.

11. The composition of claim 10 wherein said sugar component comprises from about 50 to 100% of said hexose compound or its derivative.

12. The composition of claim 11 wherein said hexose compound or its derivative is selected from the group consisting of 5-C-hydroxymethyl aldohexose; 1,6-anhydro-5-C-hydroxymethyl-β-D-aldohexopyranose; 1,6-anhydro-5-C-hydroxymethyl-α-L-aldohexopyranose; 5-C-hydroxymethyl aldohexosyl polyol; alkyl 5-C-hydroxymethyl aldohexoside, wherein the alkyl is selected from the group consisting of methyl, ethyl, propyl and isopropyl; 5-C-hydroxymethyl hexitols; di-, tri-, oligo- or polysaccharides comprising one or more of the above-mentioned simple sugars; and mixtures of these compounds; and 5-C-hydroxymethyl ketohexose; 5-C-hydroxymethyl ketohexosyl polyol; alkyl 5-C-hydroxymethyl ketohexoside, wherein the alkyl is selected from the group consisting of methyl, ethyl, propyl and isopropyl; 5-C-hydroxymethyl hexitols; di-, tri-, oligo- or polysaccharides comprising one or more of the above-mentioned simple sugars; and mixtures of these compounds.

13. The composition of claim 12 wherein said hexose compound or its derivative is selected from the group consisting of:

5-C-hydroxymethyl-L-arabino-hexopyranose;
5-C-hydroxymethyl-D-xylo-hexopyranose;
1,6-anhydro-5-C-hydroxymethyl-β-L-altropyranose;
1,6-anhydro-5-C-hydroxymethyl-β-L-idopyranose;
1,6-anhydro-5-C-hydroxymethyl-β-L-gulopyranose;
methyl 5-C-hydroxymethyl-D-xylo-hexopyranoside;
methyl 5-C-hydroxymethyl-L-arabino-hexopyranoside;
ethyl 5-C-hydroxymethyl-L-arabino-hexopyranoside;
5-C-hydroxymethyl-L-arabino-hexopyranosyl glycerol;
5-C-hydroxymethyl-α-D-glucopyranosyl-β-D-fructo furanoside;
5-C-hydroxymethyl-α-D-galactopyranosyl-(1→4)-D-galactopyranose;
5-C-hydroxymethyl-β-D-galactopyranosyl-(1→6)-D-galactopyranose;
5-C-hydroxymethyl-β-L-arabino-hexopyranosyl-α-D-glucosyl-β-D-fructose;
5-C-hydroxymethyl-D-galactopyranosyl-D-glucitol;
5-C-hydroxymethyl-α-L-arabino-hexopyranosyl-D-sorbitol;
arabinogalactan derivatives wherein at least one galactosyl group is converted to a 5-C-hydroxymethyl group;
and mixtures thereof.

14. The composition of claim 2 in the form of a flavored confectionery fat product which comprises from about 10 to about 45% of said fat component and from about 20 to about 80% of said sugar component.

15. The composition of claim 2 in the form of a baked good product which comprises from about 5 to about 30% of said fat component and from about 20 to about 60% of said sugar component.

16. The composition of claim 1 in the form of an emulsified oil product which comprises from about 20 to about 90% of said fat component and from about 2 to about 20% of said sugar component.

17. The composition of claim 1 which further comprises a noncaloric or reduced calorie sweetener.

18. The composition of claim 17 wherein said noncaloric or reduced calorie sweetener is aspartame.

19. A fat-containing and sugar-containing food composition, which comprises:
   (1) from about 2 to about 98% of a fat component having from about 50 to 100% of reduced calorie fat which comprises at least about 50% combined MML, MLM, MLL and LML triglycerides; at least about 70% combined MML and MLM triglycerides; no more than about 30% combined MLL and LML triglycerides; no more than about 15% MMM triglycerides; and no more than about 5% LLL triglycerides; wherein M=fatty acids selected from the group consisting of $C_8$ to $C_{10}$ saturated fatty acids, and mixtures thereof, and L=fatty acids selected from the group consisting of $C_{18}$ to $C_{22}$ saturated fatty acids, and mixtures thereof; and wherein said reduced calorie fat has the following fatty acid composition by weight percent:
      (a) from about 30 to about 60% $C_8$ to $C_{10}$ saturated fatty acids;
      (b) from about 30 to about 60% $C_{18}$ to $C_{22}$ saturated fatty acids;
      (c) not more than about 10% $C_{16:0}$ fatty acid;
      (d) not more than about 1% fatty acids selected from the group consisting of $C_{12:0}$ and $C_{14:0}$, and mixtures thereof; and
      (e) not more than about 1% fatty acids selected from the group consisting of $C_{18:1}$, $C_{18:2}$, $C_{18:3}$ and mixtures thereof; and
   (2) from about 2 to about 98% of a sugar component having from about 50 to 100% of a 5-C-hydroxymethyl hexose compound or its derivative selected from the group consisting of 5-C-hydroxymethyl aldohexose; 1,6-anhydro-5-C-hydroxymethyl-β-D-aldohexopyranose; 1,6-anhydro-5-C-hydroxymethyl-α-L-aldohexopyranose; 5-C-hydroxymethyl aldohexosyl polyol; alkyl 5-C-hydroxymethyl aldohexoside, wherein the alkyl is selected from the group consisting of methyl, ethyl, propyl and isopropyl; 5-C-hydroxymethyl hexitols; di-, tri-, oligo- or polysaccharides comprising one or more of the above-mentioned simple sugars; and mixtures of these compounds; and 5-C-hydroxymethyl ketohexose; 5-C-hydroxymethyl ketohexosyl polyol; alkyl 5-C-hydroxymethyl ketohexoside, wherein the alkyl is selected from the group consisting of methyl, ethyl, propyl and isopropyl; 5-C-hydroxymethyl hexitols; di-, tri-, oligo- or polysaccharides comprising one or more of the above-mentioned simple sugars; and mixtures of these compounds.

20. The composition of claim 19 wherein said reduced calorie fat comprises no more than about 5% combined MLL and LML triglycerides, no more than about 5% MMM triglycerides and no more than about 2% LLL triglycerides.

21. The composition of claim 20 wherein said reduced calorie fat comprises at least about 85% combined MML and MLM triglycerides, no more than about 5% combined MLL and LML triglycerides, no more than about 4% MMM triglycerides and no more than about 1% LLL triglycerides.

22. The composition of claim 21 wherein said reduced calorie fat has the following carbon number profile (CNP):

| CNP | (%) |
|---|---|
| 32 or lower | <3 |
| 34 | <2 |
| 36 | <4 |
| 38 | 10–40 |
| 40 | 35–60 |
| 42 | 15–40 |
| 44 | <5 |
| 46 | <1 |
| 48 | <0.6 |
| 50 | <0.6 |
| 52 | <0.4 |
| 54 or higher | <0.9 |

23. The composition of claim 22 wherein the hexose or its derivative is selected from the group consisting of:
5-C-hydroxymethyl-L-arabino-hexopyranose;
5-C-hydroxymethyl-D-xylo-hexopyranose;
1,6-anhydro-5-C-hydroxymethyl-β-L-altropyranose;
1,6-anhydro-5-C-hydroxymethyl-β-L-idopyranose;
1,6-anhydro-5-C-hydroxymethyl-β-L-gulopyranose;
methyl 5-C-hydroxymethyl-D-xylo-hexopyranoside;
methyl 5-C-hydroxymethyl-L-arabino-hexopyranoside;
ethyl 5-C-hydroxymethyl-L-arabino-hexopyranoside;
5-C-hydroxymethyl-L-arabino-hexopyranosyl glycerol;
5-C-hydroxymethyl-α-D-glucopyranosyl-β-D-fructofuranoside;
5-C-hydroxymethyl-α-D-galactopyranosyl-(1→4)-D-galactopyranose;
5-C-hydroxymethyl-β-D-galactopyranosyl-(1→6)-D-galactopyranose;
5-C-hydroxymethyl-β-L-arabino-hexopyranosyl-α-D-glucosyl-β-D-fructose;
5-C-hydroxymethyl-D-galactopyranosyl-D-glucitol;
5-C-hydroxymethyl-α-L-arabino-hexopyranosyl-D-sorbitol;
arabinogalactan derivatives wherein at least one galactosyl group is converted to a 5-C-hydroxymethyl group;
and mixtures thereof.

24. The composition of claim 23 which comprises from about 5 to about 95% of said fat component and from about 5 to about 95% of said sugar component.

25. The composition of claim 24 in the form of a flavored confectionery fat product which comprises from about 10 to about 45% of said fat component and from about 20 to about 80% of said sugar component.

26. The composition of claim 24 in the form of a baked good product which comprises from about 5 to about 30% of said fat component and from about 20 to about 60% of said sugar component.

27. The composition of claim 23 in the form of an emulsified oil produce which comprises from about 20 to about 90% of said fat component and from about 2 to about 20% of said sugar component.

28. The composition of claim 27 in the form of a margarine.

29. The composition of claim 23 which further comprises a noncaloric or reduced calorie sweetener.

30. The composition of claim 29 wherein said noncaloric or reduced calorie sweetener is aspartame.

* * * * *